Figure 7:
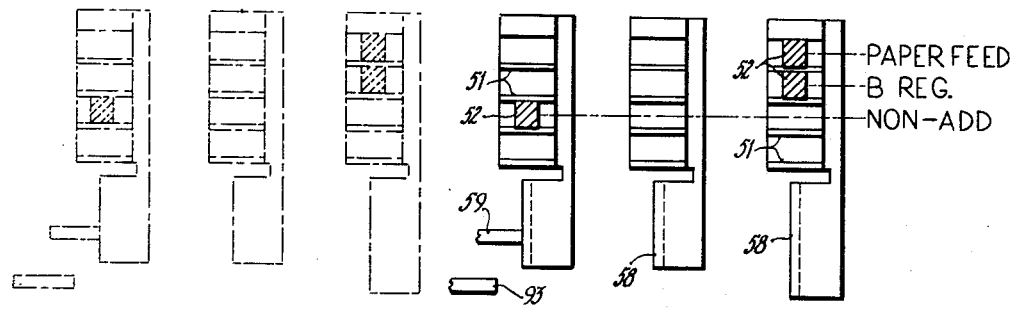

Sept. 1, 1953 O. W. SWANSON 2,650,759
ACCOUNTING MACHINE HAVING RELATIVELY ADJUSTABLE
PAPER AND CONTROL CARRIAGES
Filed Dec. 23, 1949 4 Sheets-Sheet 1
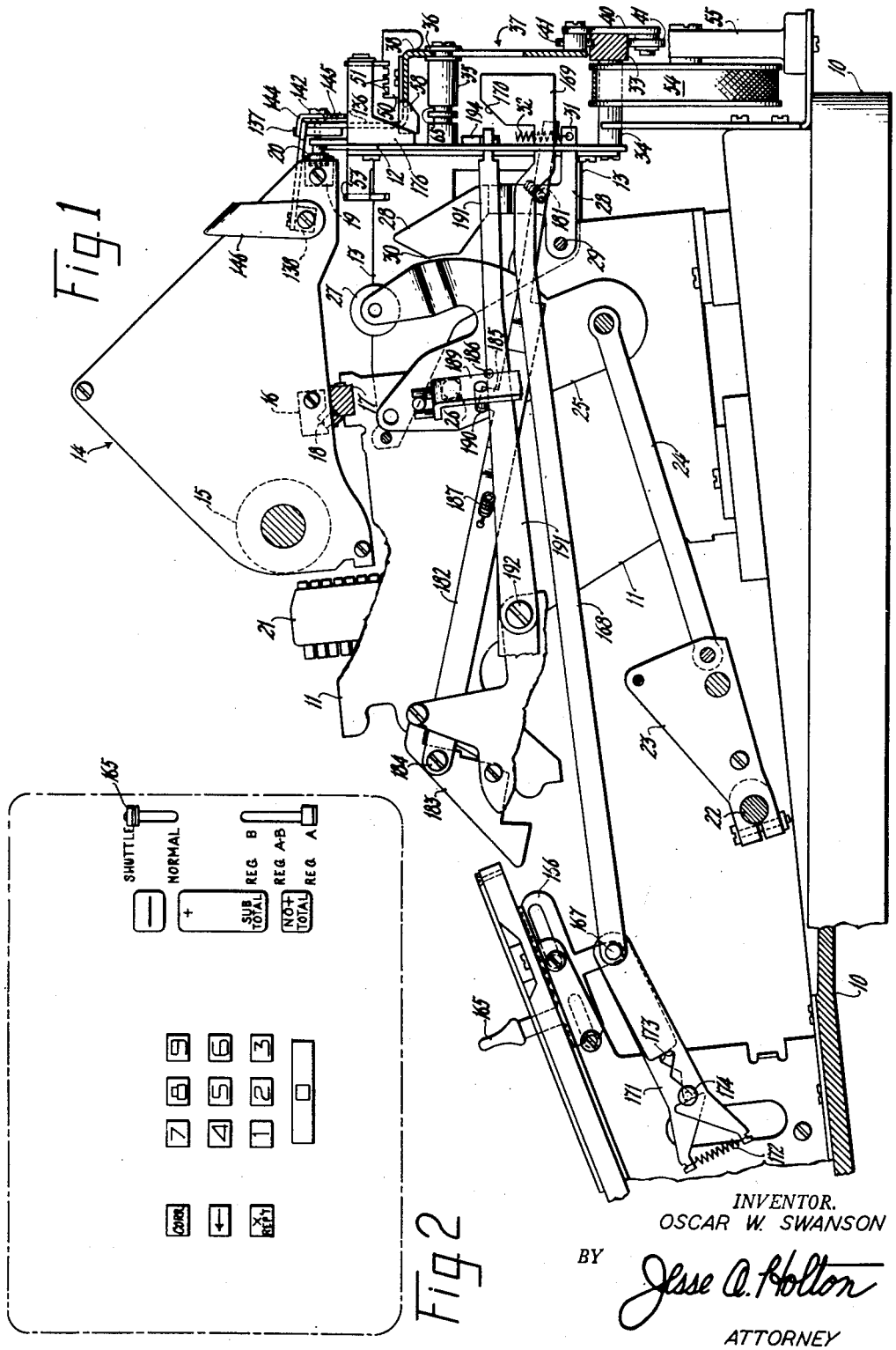
INVENTOR.
OSCAR W. SWANSON
BY
Jesse A. Holton
ATTORNEY

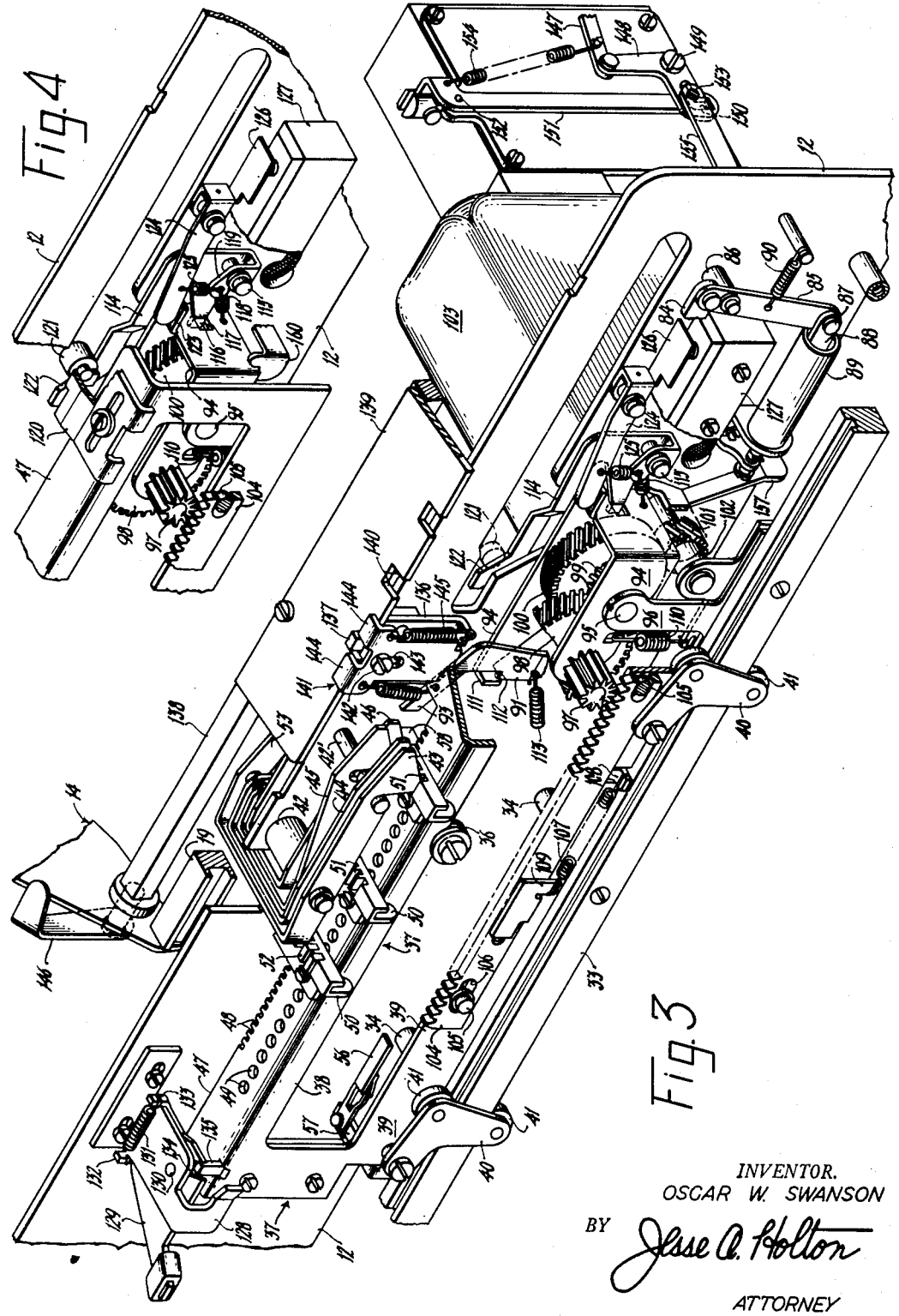

Sept. 1, 1953                 O. W. SWANSON                 2,650,759
ACCOUNTING MACHINE HAVING RELATIVELY ADJUSTABLE
PAPER AND CONTROL CARRIAGES
Filed Dec. 23, 1949                                            4 Sheets-Sheet 3
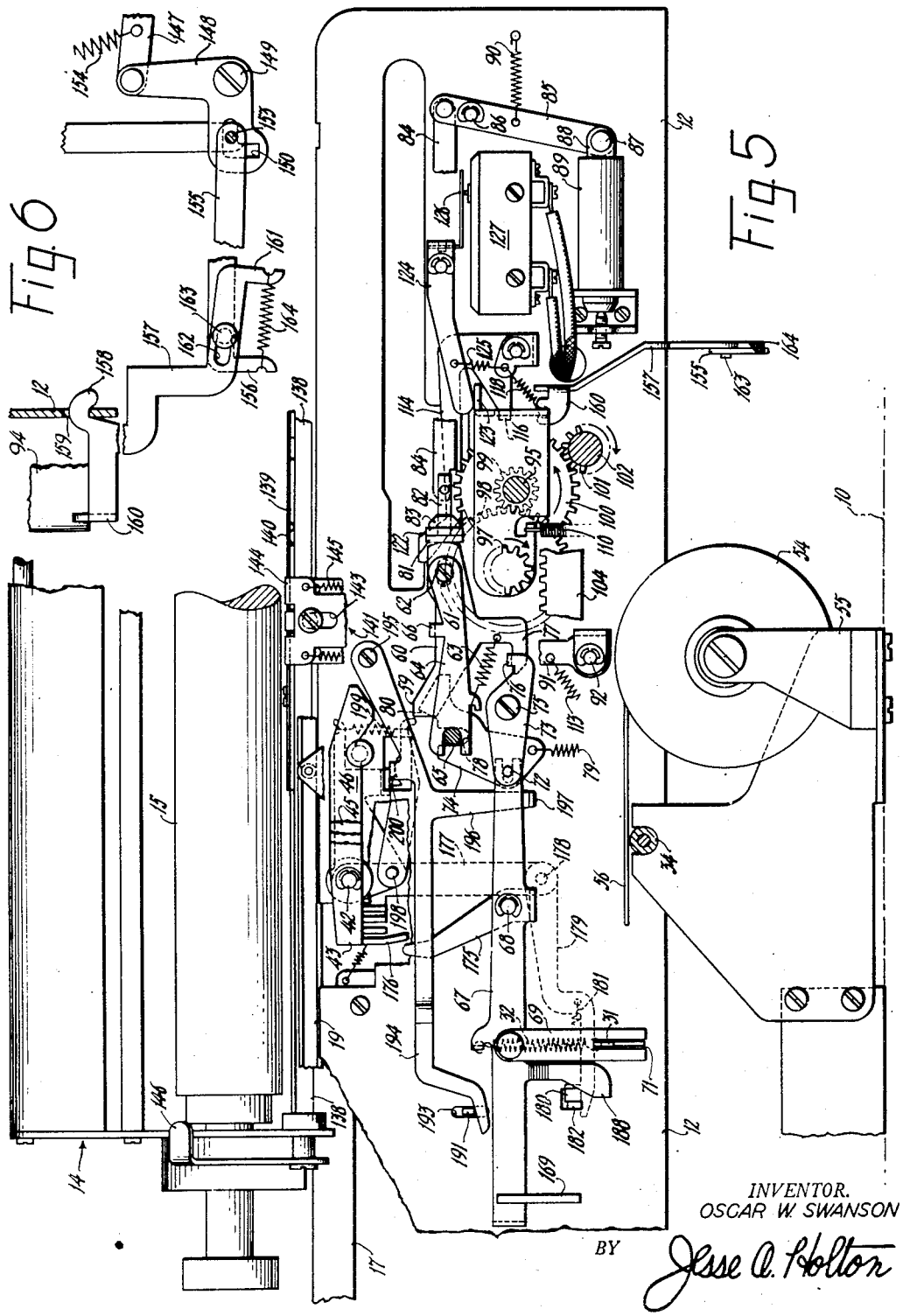
INVENTOR.
OSCAR W. SWANSON
BY
Jesse A. Holton
ATTORNEY Sept. 1, 1953 — O. W. SWANSON — 2,650,759
ACCOUNTING MACHINE HAVING RELATIVELY ADJUSTABLE
PAPER AND CONTROL CARRIAGES
Filed Dec. 23, 1949 — 4 Sheets-Sheet 4

INVENTOR.
OSCAR W. SWANSON
BY Jesse A. Holton
ATTORNEY

Patented Sept. 1, 1953

2,650,759

UNITED STATES PATENT OFFICE 2,650,759

ACCOUNTING MACHINE HAVING RELATIVELY ADJUSTABLE PAPER AND CONTROL CARRIAGES

Oscar W. Swanson, Hartford, Conn., assignor to Underwood Corporation, New York, N. Y., a corporation of Delaware Application December 23, 1949, Serial No. 134,622

5 Claims. (Cl. 235—60.42)

The present invention relates to accounting machines of the type having a traveling paper carriage. Such machines are arranged to print amounts in a plurality of columns on a work sheet and are commonly provided with means whereby the shuttling movement of the carriage between the different columns may be discontinued when it is desired to list all of the items in a single column, as for example when using the machine as a simple adding machine.

The keyboards of such machines are generally provided with keys or levers which may be manually operated to control the operation of the machine in the various columns. In addition to the manual selection of the machine functions, the carriage is commonly provided with control devices or tappets for automatically determining the function of the machine as the printing point of the carriage reaches its various columnar positions.

For many types of work it is the practice to divide the forms which are to be used for keeping the accounting records into two or more vertical sections or zones. Each zone of the work form is divided into two or more vertical columns in which are to be listed such items as account numbers, purchase price, tax, etc. The two sections or zones of the form are of course duplicates of each other, the forms being printed in such fashion merely for convenience in handling and filing.

An accounting machine for most advantageously operating upon the type of work sheet referred to above should have provision whereby the operator need merely place the form in the machine in position for printing in the left hand column of the left hand work zone, print the figures called for, tabulate to the third column, etc., and then get an automatic carriage return to the first column and a paper feed operation; all of the operations of tabulating, entering into the registers, carriage return and paper feeding, being performed automatically in response to the depression of a single key. Provision should also be made whereby, after the first accounting zone has been completely used, the operator may readily position the work sheet with respect to the printing devices so that the left hand column of the next zone is in position for being printed. When working in this second zone the carriage should be automatically returned only to the first column of said zone rather than to the first column of the first zone and such return should preferably be instituted by the same key which is used when computing in the first zone. Of course the carriage tappets must be arranged to select the same machine functions in the various columns of the second zone as were selected for the corresponding columns of the first zone, since the form is so arranged.

Accounting machines are available for working with the type of sectional forms referred to but they do not lend themselves to the ease of operation described above. Prior art machines capable of performing this type of work must be provided with a separate set of automatic control devices or tappets for each section or zone of the work form. Generally there is a separate key for causing a carriage return when working in the separate zones. That is to say there is one key, sometimes the usual motor bar employed for printing and entering the amount into a register, which will cause a carriage return to the left hand column of the left hand zone and another key which will cause the carriage to return to the left hand column of some other zone. Obviously the use of different keys in different zones is confusing and undesirable. It is likewise undesirable to have to provide separate sets of control tappets for the separate zones, especially since the one machine may be used for many different types of work merely by changing the control tappets, and therefore the fewer tappets which must be changed, the better.

It is the primary object of the present invention to provide an improved accounting machine for use with work forms of the multi-zone type.

It is another object of the present invention to provide an accounting machine for use with work forms of the multi-zone type which is operated by the same keys in all work form zones.

It is a further object of this invention to provide an accounting machine having a carriage which may be quickly and easily adjusted for causing the machine to operate in different zones of a multi-zone work sheet.

It is a still further object of this invention to provide an accounting machine having two laterally movable carriages, one of which carries all of the usual automatic controls and the other of which merely carries the platen and the usual paper feeding devices, and to equip said carriages with cooperating means whereby they may be detachably connected together in a plurality of laterally spaced relations.

These and further features, objects and advantages will become more readily apparent as the description of certain preferred embodiments of the invention proceed.

Figure 8:
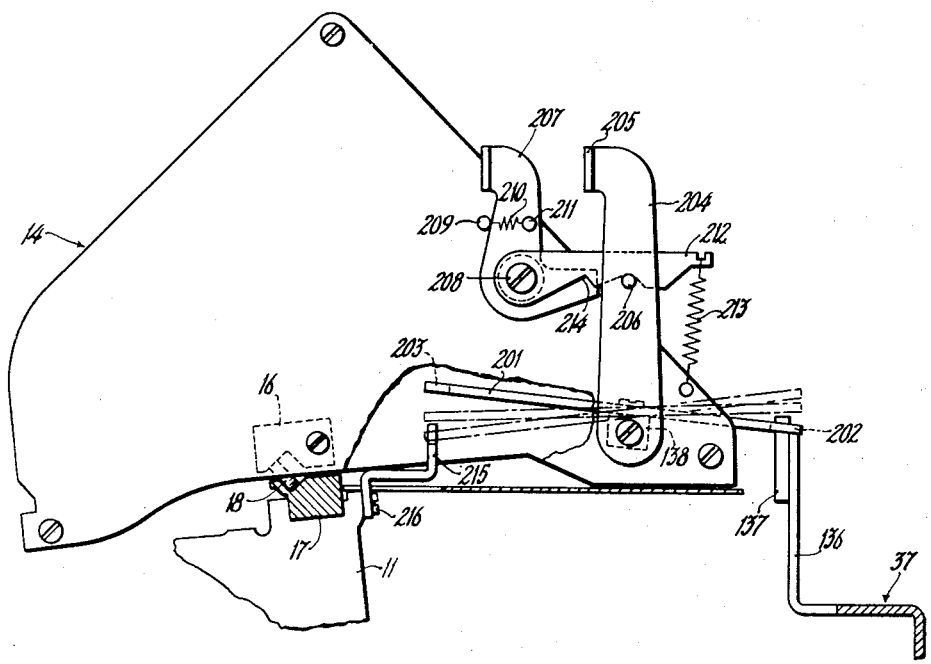

Referring now to the drawings:

Fig. 1 is a side elevational view of certain parts of an accounting machine embodying the present invention, Fig. 2 is a plan view of the machine keyboard, Fig. 3 is a perspective view showing the automatic control devices and a portion of the two carriages with which the machine is equipped, Fig. 4 is a detailed perspective view showing a portion of the mechanism shown in Fig. 3 and showing certain parts which were omitted from Fig. 3 for the sake of clarity, Fig. 5 is a rear elevational view, Fig. 6 is a side elevational view showing the means for preventing a cycle from being instituted during automatic carriage return operations, Fig. 7 is a sample of the type of work which the present invention is designed to facilitate and showing diagrammatically the column units for controlling the various functions of the machine, and, Fig. 8 is a side elevational view of a modification of certain parts of the invention.

Inasmuch as most of the features of this invention are equally applicable to a wide variety of accounting machines, no one machine has been shown in its entirety. In general however, in order to make a full disclosure, certain parts of an Underwood Sundstrand Accounting Machine have been shown. The basic machine of which parts are shown herein is known as a duplex machine because of the fact that it is provided with two crossfooters or registers and is fully disclosed in Patent No. 1,946,505, issued February 13, 1934 to O. J. Sundstrand. This basic machine has been modified as to certain features in a manner described in Patents Nos. 1,946,823 and 2,038,982 in the name of O. J. Sundstrand and in Patent No. 2,361,002 in the name of W. A. Anderson, as will more fully appear later in this specification.

In Fig. 1, the base of the machine is indicated at 10 and one of the main side frames of the computing section is indicated at 11. A supporting plate 12 extends across the rear of the machine and is fixed to the computing section by means of a pair of brackets 13, only one of which is shown.

A paper carriage 14 carries a roller platen 15 and is supported upon the computing section for movement laterally thereof by means of a pair of cooperating runners 16 and 17 having anti-friction rollers 18 therebetween and a cross channel member 19 within which is fitted a roller 20 carried by the plate 12. In accordance with the present invention, the carriage 14 is merely floating, and under certain circumstances is freely movable in either direction of travel, as will presently more fully appear.

A group of printing elements in the form of vertically moving bars 21 is provided for printing the amounts to be entered into the registers and for printing totals, as is well known.

The machine may be provided with the usual standard 10-key keyboard as indicated in Fig. 2.

The main operating shaft is shown in Fig. 1 at 22 and this shaft is connected by means of a pair of plates 23 and a pair of links 24 to a pair of main crank arms 25, only one of each pair of plates, links and crank arms being shown since this structure is well known. The crank arm 25 which is shown is pivoted to one of the side plates of the computing section at 26 and is provided with a camming roller 27 which moves rearwardly and downwardly as the machine cycles.

A three armed lever 28 is pivotally mounted upon the bracket 13 at 29. The upper arm of the lever 28 is provided with a cam face 30 for cooperation with the roller 27 and another arm has its end 31 protruding through an opening in the plate 12, as seen in Figs. 1 and 5. The lever 28 is normally held resiliently in the position shown in Fig. 1 by a spring 32.

*Automatic controls*

As seen in Figs. 1 and 3, a track 33 is fixed to the plate 12 by means of a plurality of studs 34 which extend rearwardly from said plate. There is a post 35 extending rearwardly from the plate 12 and a grooved roller 36 is rotatably mounted upon said post. The track 33 and grooved roller 36 serve to support and guide a control carriage generally designated at 37.

The control carriage 37 may comprise a generally rectangular plate having its interior portion cut away to provide an upper horizontal portion 38 and a lower portion 39 extending parallel thereto. The bottom edge of the portion 38 rests upon the grooved roller 36. The lower portion has securely fastened thereto a pair of trucks 40, each of which is provided with a pair of rollers 41 for engaging the upper and lower edges of the track 33. Thus the control carriage 37 is mounted for lateral movement in a path parallel to the path of movement of the paper carriage 14.

Secured in the plate 12 is a pivot post 42 and pivotally mounted upon said post are a plurality of function control elements 43, 44, 45 and 46, as best seen in Fig. 3. As will later more fully appear, the elements 43, 44, 45 and 46 control the functions of paper feeding, selecting "B" register, non-add and subtraction respectively. It will readily be understood that the particular control elements shown herein have been shown for illustrative purposes only and that the particular functions or the number of functions controlled are not of the essence of this invention.

The upper portion 38 of the control carriage is bent over to provide a flange 47. A plurality of notches 48 and a plurality of openings 49 are provided in said flange, as clearly seen in Fig. 3. By means of the notches 48 and openings 49, a plurality of control element operating devices 50 may be secured to the control carriage at various lateral positions. The devices 50 may be placed as needed to automatically control the function of the machine in the various columns of the work sheet form.

The construction of the devices or column units 50 and the manner in which same are attached to the flange 47 are more fully explained in the W. A. Anderson application Serial No. 134,624, filed of even date herewith. In general however, it will be apparent that each column unit 50 is provided with a slot 51 corresponding to each of the control elements 43—46. As the control carriage moves to its various columnar positions, those elements which are not to be operated lie within the slots 51 and are uneffected by the column unit. For any control element which is to be operated, the column unit is provided with a block 52 which closes the slot 51 within which it is positioned and thereby causes the corresponding control elements 43—46 to be raised, as shown by the position of element 45 in Fig. 3, to condition the machine for performing the desired function. In normal unoperated position the ends of the control elements rest upon a post 42'.

The particular work form chosen for the purpose of illustration will be seen from Fig. 7 to have provision for listing three vertical rows of data in two zones. The first column of each zone is for listing serial numbers of money orders and since the sum of these numbers would be of no value, the machine is conditioned for non-adding in this column. From Fig. 7 it will be noted that a block 52 is provided in the column unit 50 in position to operate the non-add control element 45 in this columnar position. In Fig. 3, the carriage is shown in its first column position and it will be noted that the non-add bail 45 is raised. It is of course well known that the machine is normally conditioned to add in one of the registers—the "A" register—and unless some other function is selected, either from the keyboard or by means of the automatic controls, that is the function which will be performed.

Referring to Fig. 7, it will be seen that all of the slots 51 of the middle column unit are open so that there is no function selected by the carriage when the machine is working in the second column of each zone. Therefore those figures listed in the second column will be entered additively in "A" register.

With the particular form shown it is desirable to enter amounts in the "B" register. Therefore the column unit 50 for the third column is provided with a block 52 for cooperating with, and raising, the control element 44 to thereby select the "B" register. The particular manner in which element 44 selects the "B" register forms no part of this invention and has therefore not been shown but it may operate in much the same manner as described in the Sundstrand Patent No. 1,946,823. When the "B" register is selected by the carriage, the "A" register is automatically incapacitated.

As will presently be more particularly described, after the amount has been printed in the third column of zone No. 1 the carriage is power returned automatically to the first column. It is desirable that at this time the platen be automatically line spaced so that the form will be in position for printing the new serial number without further ado. Therefore, the column unit 50 for the third column is provided with a second blocking means 52 to cooperate with the paper feed control element 43, as shown in Figs. 3 and 7. The particular manner in which the paper feed operation is performed is not the concern of this invention and it is believed to be sufficient to point out that a paper feed operation would normally be performed during each cycle of the machine if some means for preventing it were not employed. The bail 43 serves as the means for preventing paper feeding when it is in its normal position, and when it is raised it allows the paper to be fed. The forward arm of the bail 43 is indicated in Figs. 1 and 3 at 53 and corresponds to member 1107 of the Sundstrand Patent No. 2,088,982.

The control carriage 37 is constantly urged toward the left of the machine, to the right as viewed in Figs. 3, 4 and 5, as is the case with the usual paper carriages of account machines. In the particular embodiment of the invention shown, the power to drive the control carriage in its tabulating direction is supplied by a spring reel 54 mounted upon a bracket 55 fixed to the base 10. The reel is connected by means of a steel tape 56 to an ear 57 provided upon the carriage 47.

Tabulating movement of the carriage is normally prevented by the abutment of an ear 58 on one of the column units 50 against a tab stop 59. The ear 58 is shown in Figs. 1 and 3, the tab stop 59 in Fig. 5 and the normal abutting relation is shown diagrammatically in Fig. 7. When the tab stop 59 is lowered from its Fig. 5 position, the carriage moves under the urge of the spring reel 54 to the next columnar position where an ear 58 on the next column unit strikes the tab stop 59, which by then will have been restored to its raised position.

*Tabulation*

The construction and mode of operation of the tab stop will now be explained. As seen in Fig. 5, the tab stop 59 is the upper arm of a three armed lever 60. The lever 60 is provided with a slot 61, by means of which it is mounted upon a screw stud 62 extending rearwardly from the supporting plate 12. A spring 63 extending between the lower arm of lever 60 and an ear provided upon a plate 64 urges said lever in a clockwise direction, as viewed in Fig. 5, to position the tab stop portion 59 thereof in the path of the ears 58 of the column units. The plate 64 is firmly fixed between the screw stud 62 and a reduced portion 65 of the post 35 and is provided with a tab 66 against which the lever 60 strikes to limit the clockwise movement thereof.

A lever 67 is pivotally mounted upon the supporting plate 12 by means of a stud 68 and, as seen in Fig. 5, is connected by means of the aforementioned spring 32 to the end 31 of lever 28. A pendant 69 pivoted to the lever 67 at 70, and provided with an open ended slot 71 within which the end 31 of lever 28 rides, limits the movement of lever 67 toward said end 31. A bifurcated end of lever 67 is fitted about a pin 72 extending between one end of a lever 73 and a secondary tab stop 74. The lever 73 is pivotally mounted upon the plate 12 by means of a screw 75 and at the end opposite the pin 72 is provided with a tab 76 which rests upon an offset portion 77 of the lower arm of lever 60. The secondary tab stop member 74 is provided with an open ended slot 78 and the post 35 extends through said slot to normally support the secondary tab stop in the position shown in Fig. 5 and to allow same to move upward and pivot about said post, as will subsequently appear. A spring 79 extending between the member 74 and a fixed anchor, not shown, holds the member 74 in such manner that its upper end 80 is lower than the tab stop 59 and out of position for cooperating with the ears 58 of the column units.

After the amount has been indexed from the keyboard, the main motor bar, marked "+" and "sub-total" in Fig. 2 is depressed to cause the amount to be printed, as is well known. As the machine cycles, the crank arm 25 is rocked clockwise about the pivot 26 and the roller 27 strikes the cam face 30 and thereby rocks the lever 28 clockwise about its pivot 29. This causes the end 31 of lever 28 to be moved downward from its position shown in Fig. 5.

As the end 31 moves downward from the Fig. 5 position, the lever 67 is rocked counterclockwise about the stud 68 under the urge of the spring 32. As will readily be appreciated, the bifurcated end of lever 67 will, due to its engagement with the pin 72, cause the lever 73 to move in a clockwise direction. The tab 76 pulls down on the offset end 77 of the three armed lever 60 to thereby lower the tab stop 59 from engagement with the ear 58 of the column unit.

As the tab stop 59 is lowered, the secondary tab stop 74 is raised due to the action of the bifurcated end of lever 67, to thereby position the upper end 80 thereof in the path of column unit ear 58. This secondary tab stop remains in effective position until after the printing has been completed, and during the last part of the cycle the roller 27 moves away from the cam face 30 and the spring 79 returns the parts to the position shown in Fig. 5. Since the column unit ear 58 will have moved past the tab stop 59 before contacting the secondary stop 74, lowering of stop 74 allows the carriage to escape to the point where the ear 58 of the next adjacent column unit strikes the now repositioned tab stop 59.

The elongated slot 61 in the tab stop lever 60 allows a lateral movement to be imparted to said lever when the tab stop 59 is struck by a column unit. The arm of lever 60 within which the slot 61 is provided is rounded and is normally in abutment with a shoe 81 mounted upon stem 82. The stem 82 is slidably mounted within a bracket 83 and is secured to one end of a push link 84, the other end of which is pivotally connected to one end of a lever 85. The lever 85 is pivotally mounted upon a stud 86 secured in the supporting plate 12 and has its other end pivotally connected at 87 to a piston 88 of a dash pot 89. A spring 90 urges the lever 85 in a counterclockwise direction, as viewed in Figs. 3 and 5. Thus when no column unit ear is resting against the tab stop 59, the spring 90 is effective to move said tab stop to the left as viewed in Fig. 5 through contact of the shoe 81 with the rounded end of the arm of lever 60. When a column unit strikes the tab stop at the end of a tabulating movement, the elongated slot 61 allows the lever 60 to be displaced toward the right and the dash pot 89 absorbs the shock incident to bring the carriage to rest.

As previously stated, it is desirable that after the entry of the amount in the last column, the carriage be returned to position for working in the first column, and for that purpose mechanism has been provided which will now be described.

Carriage return

The tab stop ear 58 of the right hand column unit is made somewhat longer than the ears 58 of the other column units, as will be evident from an inspection of Fig. 7. A latch lever 91 is pivotally mounted upon the supporting plate 12 at 92, see Fig. 5, and its upper end 93, Fig. 3, is positioned so as not to be in the path of movement of the tab stop ears 58 of the first two column units but to be in the path of the longer ear of the third column unit, as diagrammatically shown in Fig. 7.

A bail 94 is pivotally mounted upon a shaft 95 extending between the supporting plate 12 and a bracket 96 secured to the inside of the track 33, as best seen in Fig. 3. A carriage return pinion 97 and a pinion driving gear 98 are rotatably mounted upon the bail 94 and a pinion 99 and gear 100 rotatable upon the shaft 95 mesh respectively with the gear 98 and a pinion 101 secured to the drive shaft 102 of an electric motor 103.

A carriage return rack 104 is mounted upon the lower portion 39 of the control carriage 37 by means of a pair of studs 105 fixed to the portion 39 and extending through elongated slots 106 in said rack. A spring 107 extends between an ear 108 on the lower portion 39 of the control carriage and an ear 109 on the rack 104 and resiliently holds the rack in its Fig. 3 position, for a purpose which will presently become apparent.

A spring 110 urges the bail 94 in a direction to mesh the carriage return pinion 97 with the rack 104 but a tab 111 provided upon one arm of the bail normally rests upon a shoulder 112 of the latch lever 91 and prevents the pinion from engaging the rack. The latch lever 91 is urged by a spring 113 in a direction to keep the shoulder 112 under the tab 111. The motor 103 is the motor which drives all the parts of the machine, so that the pinion 97 is spun every time the machine cycles, but it will normally have no effect because it is not in engagement with the rack 104.

As the carriage begins to escape after the entry of the amount in the last column, the elongated ear 58 will strike the upper end 93 of the latch lever 91, as is apparent in Fig. 7, and thereby rock said lever in opposition to its spring 113. This rocking of latch lever 91 of course removes the shoulder 112 from beneath the tab 111 and the spring 110 thereupon rocks the bail 94 and meshes the pinion 97 with the rack 104.

As best seen in Figs. 3 and 4, a shut off lever 114 is pivotally mounted upon the plate 12 by means of a stud 115 and said lever is provided with a nose 116 which is fitted within an opening 117 in the bail 94. A light spring 118 extending between an ear 119 of lever 114 and the bail 94 takes up any slack that might exist due to the looseness of the fit of nose 116 in the opening 117. A bracket 120 is adjustably secured to the flange 47 of the carriage 37 and carries a roller 121 for cooperation with a cammed end 122 of the lever 114.

As the carriage returns to its home position, the roller 121 strikes the cammed end 122 of lever 114 and through the action of the nose 116 against the bail 94, said bail is restored to its normal position wherein the pinion 97 is again out of mesh with the rack 104. The spring 113 snaps the shoulder 112 of latch lever 91 beneath the tab 111 to hold the bail in its normal position.

Now considerable power is required to move the end of lever 114 to restore the bail 94, and the normal cycling of the machine is completed before the roller 121 strikes the cammed end of lever 114. It is therefore necessary to keep the motor 103 energized until the bail 94 is restored. The bail 94 is provided with a shoulder 123 upon which rests one arm of a lever 124. The lever 124 is pivotally mounted upon the supporting plate 12 and its end is held in contact with the shoulder 123 by means of a light spring 125. The other end of lever 124 is positioned slightly above a contact closing element 126 of a micro-switch 127 connected in a circuit with the motor 103. As long as the bail 94 is positioned to mesh the pinion 97 with the rack 104, the lever 124 holds the micro-switch closed and the motor continues to drive the pinion 97 even though the cycle of the machine has been completed. As the roller 121 restores the bail 94 to normal position, the spring 125 causes the end of lever 124 to follow the shoulder 123, thereby opening the switch 127 and stopping the motor.

Referring to Fig. 3, it will be seen that a rebound check and shock absorbing device has been provided to take up the usual shock incident to normal power carriage returns. A bracket 128 is secured to the supporting plate 12 and a swinging lever 129 is pivotally connected to said bracket at 130. A spring 313 of medium weight is secured between a pair of ears 132 and 133 provided upon the bracket 128 and lever 129 respectively. The lever has an open ended slot 134 extending at an angle to the path of movement of the control carriage and the carriage is provided with a post 135 for cooperation with said slot. As the carriage is returned, the post 135 strikes one side of the open ended slot 134 and causes the swinging lever 129 to move against the action of spring 131. This movement of lever 129 takes up the shock and the angle of the slot 134 prevents a fast rebound of the carriage.

*Connection between control carriage and paper carriage*

The above described operations of tabulation and carriage return are of course effective upon the control carriage 37 and unless said control carriage is connected to the paper carriage 14, the paper carriage remains stationary. It will be remembered that according to the present invention, the paper carriage is merely floating and has no provision for movement except as moved by the control carriage or by hand.

The flange 47 of the control carriage is provided with an upturned portion 136 to which is secured by welding or other means a post 137, as best seen in Figs. 1 and 3. Mounted for pivotal movement upon the paper carriage 14 is a square rod 138 to which is secured a plate 139 having a series of notches 140 cut into one edge thereof. When the post 137 is located within one of the notches 140, the paper carriage will partake of any movement imparted to the control carriage, as will readily be understood. A member 141 is slidably mounted upon the upturned portion 136 by means of a screw 142 secured in said upturned portion and extending through an elongated opening 143 in said member. The member 141 is provided with a pair of flanges 144 which extend over the edge of the plate 139 adjacent the post 137 and is urged downwardly by a pair of springs 145 which extend between the member 141 and the flange 47. The flanges 144 serve to prevent accidental displacement of the plate 139 and have another function presently to be explained.

A finger piece 146 is secured to the rod 138 and by means of said finger piece, the operator may easily rock the rod 138 and consequently raise the notched edge of the plate 139 to a point where the top of the post 137 is below the row of notches. The paper carriage 14 may then be freely moved laterally while the control carriage 37 remains stationary. Thus means has been provided whereby the paper carriage and the control carriage may be positively connected together in a number of different relations.

Referring to Fig. 7, the position of the paper carriage with respect to the column units of the control carriage when working in zone No. 1 of the work sheet is shown by the chain-dotted lines of the column units. In this zone the paper carriage will have been manually moved to the right with respect to the control carriage and coupled to said control carriage by positioning one of the notches 140 near the left end of the plate 139 about the post 137. After the first zone has been completely filled, the operator merely turns the platen 15 backwards to bring the form to its first line position and then, by operating the finger piece 146 and sliding the paper carriage to the left, reconnects the two carriages in the relative positions shown by the column units in full lines.

Since the control carriage performs the same tabulating and return movements regardless of the lateral position of the paper carriage with respect thereto, it will be apparent that when working in the second zone, the paper carriage will be returned to position for printing in the first column of that zone after the entry of the amount in the third column of that zone. It will also be apparent that the operation of the same keys will produce the same results in any of the zones with which the work sheet may be provided, since the control carriage 37 always operates in the same manner regardless of the relative position of the paper carriage 14, and consequently of the work sheet form, with respect thereto.

To prevent the cycling of the machine and a consequent possible erroneous operation thereof during power carriage return movements, the following mechanism has been provided.

*Cycle prevention during power carriage return*

The various motor energizing keys, those marked "—," "+ and sub-total" and "no + and total," are connected to a link 147, shown in Figs. 3 and 6 in such manner that when any one of them is depressed, said link will be moved toward the front of the machine. A bell crank 148 is pivotally mounted on a stationary part at 149 and one of its arms is pivotally connected to one end of the link 147. As best seen in Fig. 6, the other arm of said bell crank is provided with an angled slot 150. A slide 151 is pivotally and slidably mounted connected to a stationary part at 152 and is provided with a pin 153 fitted within the angle slot 150. A spring 154 connected between the link 147 and the upper end of slide 151 holds said slide in its lowered position and urges same in a clockwise direction about the point 152. When the slide 151 is raised the motor 103 is energized and a one revolution clutch, not shown, is engaged to cause the machine to execute a cycle of operation, as is well known. The Anderson Patent No. 2,361,002 shows a similar arrangement except that in that patent the cycle is instituted by lowering a member similar to slide 151 instead of raising same.

A link 155 is connected at one end to the pin 153 and at its other end is provided with a foot 156. A member 157 is pivotally connected to the supporting plate 12 by means of a hook 158 which extends through a slot 159 in said plate and is provided with a portion 160 which underlies the hereinbefore described bail 94, as best seen in Figs. 4, 5 and 6. One end of member 157 is provided with a foot 161 and an elongated slot 162 is provided in said member near its foot 161. A headed stud 163 is secured to the link 155 and extends through the slot 162. A spring 164 extending between the feet 156 and 161 normally holds the member 157 and link 155 in the relative positions shown in Fig. 6.

When a carriage return operation is not being performed, the bail 94 presses against the portion 160 of member 157 and the spring 164 is of sufficient strength to hold the pin 153 in the upper portion of angle slot 150 against the action of spring 154. If the link 147 is then drawn forward by depression of any of the cycle instituting keys, the bell crank 148 will rock clockwise and the slide 151 will be raised, as will readily be appreciated, to institute a cycle in the usual manner. However, as that part of the bail 94 overlying the portion 160 of member 157 is raised during a power carriage return, the spring 154 rocks the slide 151 about the point 152 and thereby moves the pin 153 over the vertical portion of angle slot 150. An operation of a cycle instituting key at this time will not raise the slide 151 because the bell crank 148 will not be given sufficient movement to operate the pin 153.

Normalizing means

It is sometimes desirable to use the machine as a simple adding machine wherein all of the items are listed in a single vertical column. For this purpose, a normalizer lever 165 has been provided. As shown in Fig. 1, the normalizer lever 165 is carried by a slide 166 to which is pivotally connected at 167 a long arm 168 which extends through a guide slot provided therefore in the support plate 12. The arm 168 is provided with an enlarged head portion 169 having a cam face 170 thereon. Pivotally connected to the slide 166 and the arm 168 at the point 167 are a pair of members 171 the free ends of which are urged together by a spring 172 and each of which is provided with a pair of detent notches 173. A stationarily mounted pin 174 extends between the members 171 and said pin in co-operation with the notches 173 serves to resiliently hold the normalizer lever 165 and the arm 168 in either of two positions to which it may be manually moved.

With the lever 165 in the position shown in the drawings, the machine operates as above described. When the lever 165 is moved to the position marked "normal" in Fig. 2, the cam face 170 moves beneath one end of lever 67, the left end as viewed in Fig. 5, and rocks said lever about its pivot 68. The end of lever 67 then rests upon the upper portion of the enlarged head 169. When the machine is cycled, the end 31 of lever 28 moves downward as previously described, but the lever 67 cannot rock to institute a tabulation of the carriage because it is resting upon the head of arm 168 and the downward movement of the end 31 therefore only serves to tension the spring 32 by means of which said end is connected to the lever 67.

As shown in Fig. 5, the lever 67 carries an upstanding arm 175, the upper end of which normally lies adjacent a downwardly extending portion 176 of the paper feed bail 43. When lever 67 is rocked by movement of the normalizer lever to the "normal" position, the upper end of arm 175 strikes the portion 176 of bail 43 and rocks said bail to allow a paper feed during each cycle of the machine.

If the machine is normalized when the control carriage is in position for operating the non-add bail 45, it is nevertheless possible to perform addition or subtraction. As shown in dotted lines in Fig. 5, the non-add bail 45 is provided with a downwardly extending arm 177 to which is pivotally connected at 178 a member 179 having a shoulder 180 thereon. The member 179 is resiliently connected by means of a spring 181 to an arm 182, the end of which is held against the shoulder 180 by said spring. The member 182, which corresponds to the member 1035 of the Sunstrand Patent No. 2,088,982, referred to above, is pivotally connected to a non-add determining member 183 at 184 and is provided with a shoulder 185 for sometime cooperation with a pin 186 carried by the right hand arm 25, shown in Fig. 1. A spring 187 extending between the member 182 and the frame of the machine urges said member in a direction to take the shoulder 185 out of the path of pin 186.

When the member 183 is rocked counterclockwise by the action of pin 186 on the shoulder 185, no addition or subtraction takes place, as explained in the Sundstrand Patent No. 2,088,982, and as is well known. The spring 187 is normally sufficient to hold the shoulder 185 out of the path of pin 186 but, referring to Fig. 5, when the control bail 45 is rocked, the member 179 moves to the right tensioning the spring 181 and pulling the end of member 182 along with it against the action of spring 187 to thereby move the shoulder 185 into the path of the pin 186. When the machine is normalized at the time when the non-add bail 45 is being operated by the automatic controls, a cammed arm 188 on the lever 67 wipes against the end of member 182 and moves it back to the position wherein its shoulder 185 is out of the path of the pin 186 and the machine will then add.

Movement of the lever 165 to the "normal" position also conditions the machine for adding even though it may at that time be carriage selected for subtracting. Though the example illustrated does not call for automatic subtraction control, the same will be briefly described. A subtraction bail 189, shown in Fig. 1, when raised causes subtraction to be performed. The bail 189 is provided with a pin 190 overlying a lever 191 pivotally mounted at 192. As seen in Figs. 1 and 5 the rear end of lever 191 extends through an elongated slot 193 in the plate 12 and rests upon the end of one arm of a member 194. The member 194 is pivotally mounted at 195 and has a downwardly extending arm 196 provided with an ear 197 lying under the bifurcated end of lever 67. The "subtraction" control element 46 is made in two parts pivoted together at 198 and urged toward each other by a spring 199. As may be seen in Fig. 5, the member 194 is provided with a tab 200 extending between the two parts of the control element 46. When the lever 165 is in the "shuttle" position and the subtraction control element 46 is raised by a column unit block 52, both parts of the element 46 are raised as a unit, the spring 199 being strong enough to lift the member 194, the tab 200 of which overlies the lower part of said element. This of course raises the lever 191 which in turn lifts the bail 189 and causes subtraction to be performed. If the lever 165 is now moved to "normal" position, the lever 67 will be rocked clockwise as viewed in Fig. 5, as aforesaid, and its right hand end will push against the ear 197 and rock the member 194 about its pivot 195 against the action of spring 199 and the member 191 will fall of its own weight to allow the bail 189 to be lowered and condition the machine for addition.

When using a single vertical column, it may be desirable to position the two carriages at some relative lateral position not provided for by the notches 140 of plate 139. For that reason the flanges 144 have been made wide enough and the spring 145 has been made strong enough to frictionally hold the paper carriage in any desired position with the post 137 not located within a notch 140. Without this frictional connection, the vibrations of the machine could cause the paper carriage to become displaced when the relative positions of the two carriages was such that the post 137 was not located within one of the notches 140.

Program controlled vertical listing

It is sometimes desirable to have the machine perform its full automatic program of operations but to print all of the information in a single vertical column and for that purpose the structure shown in Fig. 8 has been devised. According to this form of the invention, the plate 139 is replaced with a plate 201 having a series of notches 202 in one edge corresponding to the notches 140 of the plate 139 and having a second series of notches 203 in its other edge. An operating member 204 having a tab 205 at its upper end and provided with a pin 206 is secured to the rod 138. A pawl 207 is pivotally mounted upon the paper carriage 14 by means of a screw 208 and is urged in a counterclockwise direction against a stop pin 209 by a spring 210 extending between said stop pin and a pin 211 on said pawl.

A detent lever 212 is pivotally mounted upon the screw 208 and is urged downward against the pin 206 by means of a spring 213. A pair of notches 214 are provided in the lower edge of lever 212.

With the member 204 in its vertical position the plate 201 is in its full line position shown in Fig. 8, with one of the notches 202 accommodating the post 137, thereby coupling the paper carriage and the control carriage together as previously explained.

When the member 204 is moved forward until the pin 206 strikes the end of pawl 207, the plate 201 takes up the horizontal or middle position so that the paper carriage may be freely moved to change its relation to the control carriage.

A post 215, similar to the post 137 is secured to the frame of the machine at 216 and when the pawl 207 and the member 204 are moved toward each other the end of pawl 207 is lowered so that the pin 206 of member 204 may move past the same and cause the plate 201 to take up its most counterclockwise rocked position, wherein one of the notches 203 will be positioned about the post 215 to thereby hold the paper carriage 14 from movement but to allow the control carriage 37 to perform its hereinbefore described tabulating and returning movements. The notches 214 by receiving the pin 206 serve to detent the member 204 in either position to which it may be moved.

Having thus described my invention, I claim:

1. In an accounting machine, a group of printing elements, a computing section, a plurality of control elements carried by said computing section for determining the various functions of the machine, a first carriage mounted upon said computing section, a spring urging said carriage in a tabulating direction, a plurality of column units spaced adjustable lateral distances along said carriage for operating said control elements, a tab stop normally located in the path of said column units and retractable during a cycle of said machine for allowing said carriage to move under the urge of its spring to positions whereat different column units are so situated as to operate said control elements, a second carriage mounted upon said computing section and carrying a roller platen for cooperation with said printing elements, means for detachably connecting said carriages together in a plurality of different lateral relations whereby the printing point on said platen may be laterally shifted with respect to said printing elements independently of the first carriage and said second carriage will partake of any movement imparted to said first carriage.

2. In an accounting machine, a group of printing elements, a computing section, a plurality of control elements carried by said computing section for determining the various functions of the computing section, a first carriage mounted upon said computing section, a spring urging said carriage in a tabulating direction, a plurality of column units spaced adjustable lateral distances along said carriage for operating said control elements, a tab stop normally located in the path of said column units and retractable during a cycle of said machine for allowing said carriage to move under the urge of its spring to positions whereat different column units are so situated as to operate said control elements, a second carriage mounted upon said computing section and carrying a roller platen for cooperation with said printing elements, means for detachably connecting said carriages together in a plurality of different lateral relations whereby the printing point on said platen may be laterally shifted with respect to said printing elements independently of the first carriage and said second carriage will partake of any movement imparted to said first carriage, and manually operable means for preventing retraction of said tab stop so that said first carriage cannot move in a tabulating direction and consequently said second carriage cannot move, said manually operable means being also so associated with said control devices as to disable them and thereby liberate the computing section from control by the column units of said first carriage.

3. An accounting machine of the class described, comprising a computing section operable to perform accounting functions and including printing members and function control members, a control carriage mounted for lateral movement on said computing section, control elements on said control carriage to variously operate said function control members, tabulating mechanism for said control carriage to move said control carriage to and arrest it in any of a plurality of columnar positions, a work sheet carriage mounted for free manual adjustment on said computing section with respect to said printing members, and manually releasable interlocking means on said carriages to connect said carriages in any of a plurality of different relative positions whereby said control carriage by its positions may determine the imprint receiving positions of said work sheet carriage.

4. An accounting machine of the class described comprising a computing section operable to perform accounting functions and having printing members and function control members therein, a control carriage mounted on said computing section for lateral movement, column control members on said control carriage, tabulating mechanism interconnecting said computing section and said control carriage to move said control carriage to and retain it in columnar positions as determined by said column control members, a work sheet carriage supported on said computing section for free manual adjustment with respect to said printing members, said work sheet carriage including a platen to hold a work sheet to receive imprints from said printing members in any lateral position of said work sheet carriage, and manually releasable interlocking means on said carriages to retain said work sheet carriage in any of a plurality of different lateral positions with respect to said control carriage.

5. An accounting machine as set forth in claim 4 including means to line space said platen of said work sheet carriage and members on said control carriage to control operation of said line space means in any of said plurality of different lateral positions of said work carriage.

OSCAR W. SWANSON.

References Cited in the file of this patent

UNITED STATES PATENTS

| Number | Name | Date |
|---|---|---|
| 1,238,055 | Thornton | Aug. 21, 1917 |
| 1,288,288 | Thieme | Dec. 17, 1918 |
| 1,321,648 | Landsiedel | Nov. 11, 1919 |
| 1,397,774 | Muller | Nov. 22, 1921 |
| 1,922,653 | Anderson | Aug. 15, 1933 |
| 1,942,216 | Muller | Jan. 2, 1934 |
| 1,946,505 | Sundstrand | Feb. 13, 1934 |
| 1,946,823 | Sundstrand | Feb. 13, 1934 |
| 2,012,317 | Muller | Aug. 27, 1934 |
| 2,088,982 | Sundstrand | Aug. 3, 1937 |
| 2,194,270 | Sundstrand | Mar. 19, 1940 |
| 2,214,897 | Bower | Sept. 17, 1940 |
| 2,243,075 | Anneren et al. | May 27, 1941 |
| 2,284,803 | Crosman | June 2, 1942 |
| 2,285,640 | Anderson | June 9, 1942 |
| 2,348,169 | Muller | May 2, 1944 |
| 2,361,002 | Anderson | Oct. 24, 1944 |